United States Patent
Lee et al.

(10) Patent No.: US 9,894,128 B2
(45) Date of Patent: Feb. 13, 2018

(54) SELECTIVE TRANSCODING

(71) Applicant: KT CORPORATION, Gyeonggi-do (KR)

(72) Inventors: Jin-Geun Lee, Gyeonggi-do (KR); June-Young Jeon, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 109 days.

(21) Appl. No.: 14/802,983

(22) Filed: Jul. 17, 2015

(65) Prior Publication Data
US 2016/0021163 A1    Jan. 21, 2016

(30) Foreign Application Priority Data
Jul. 17, 2014    (KR) .................. 10-2014-0090605

(51) Int. Cl.
*H04L 12/16* (2006.01)
*H04L 29/06* (2006.01)
*H04W 4/18* (2009.01)

(52) U.S. Cl.
CPC .......... *H04L 65/605* (2013.01); *H04L 65/103* (2013.01); *H04L 65/1069* (2013.01); *H04W 4/18* (2013.01)

(58) Field of Classification Search
None
See application file for complete search history.

(56) References Cited

U.S. PATENT DOCUMENTS

| | | | | |
|---|---|---|---|---|
| 8,804,697 | B1* | 8/2014 | Capper | H04L 65/00 370/352 |
| 2006/0155602 | A1 | 6/2006 | Kim et al. | |
| 2006/0253538 | A1* | 11/2006 | Jung | H04L 65/1006 709/206 |
| 2006/0256748 | A1* | 11/2006 | Jung | H04L 65/103 370/328 |
| 2007/0171841 | A1 | 7/2007 | Witzel et al. | |
| 2009/0067411 | A1* | 3/2009 | Heidermark | H04L 29/06027 370/352 |
| 2010/0004014 | A1 | 1/2010 | Coulombe | |
| 2011/0136483 | A1* | 6/2011 | Dwight | H04W 28/18 455/422.1 |
| 2012/0021796 | A1 | 1/2012 | Coulombe | |

FOREIGN PATENT DOCUMENTS

| | | |
|---|---|---|
| KR | 10-2006-0055172 A | 5/2006 |
| KR | 10-2006-0074786 A | 7/2006 |
| KR | 10-2007-0061292 A | 6/2007 |
| KR | 10-2008-0108405 A | 12/2008 |
| KR | 10-2013-0116630 A | 10/2013 |

* cited by examiner

*Primary Examiner* — Alex Skripnikov
(74) *Attorney, Agent, or Firm* — IP Legal Services, LLC

(57) ABSTRACT

The disclosure is related to selective transcoding performed between a calling party and a called party. Such transcoding method may include receiving a call connection request message from a calling user equipment, determining whether transcoding is required for communication between the calling user equipment and a called user equipment based on the received call connection request message, and initiating the transcoding when the transcoding is determined as required.

16 Claims, 4 Drawing Sheets

SELECTIVE TRANSCODING

CROSS REFERENCE TO PRIOR APPLICATIONS

The present application claims priority under 35 U.S.C. § 119 to Korean Patent Application No. 10-2014-0090605 (filed on Jul. 17, 2014).

BACKGROUND

The present disclosure relates communication and, more particularly, to performing selective transcoding between two parties each using different codec.

Transcoding is a process of converting a media file or object from one format to another. Such transcoding is used to match a codec between a calling party and a called party. Since a communication network include various types of heterogeneous networks each employing different technology and protocol, transcoding becomes an essential process for communication between two parties in such a heterogeneous communication environment.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, transcoding may be selectively performed only when a called party does not have a codec supported by a calling party.

In accordance with another aspect of the present embodiment, an application server may determine whether transcoding is necessary between a calling party and a called party before transmitting a call connection request message from the calling party to the called party.

In accordance with still another aspect of the present embodiment, an application server may initiate transcoding between a calling party and a called party only when the calling party does not have a codec supported by the called party.

In accordance with yet another aspect of the present embodiment, a calling party having no codec supported by a called party may be communicated with the called party through two paths: one established between the calling path and a transcoding server and the other established between the transcoding server and the called path.

In accordance with yet another aspect of the present embodiment, an application server may determine that transcoding is required between a calling user equipment and a called user equipment i) when a common codec is not included in codec lists of the calling user equipment and the called user equipment, ii) when an essential codec of a communication network associated with the called user equipment is not included in the calling party codec list, and/or iii) when a session description protocol (SDP) format type of the communication network associated with the called user equipment is not supported by the calling user equipment.

In accordance with at least one embodiment, a method may be provided for selectively performing, by an application server, transcoding between a calling party and a called party. The method may include receiving a call connection request message from a calling user equipment, determining whether transcoding is required for communication between the calling user equipment and a called user equipment based on the received call connection request message, and initiating the transcoding when the transcoding is determined as required.

For the receiving a call connection request message, a calling party softswitch associated with the calling user equipment may perform: receiving a message from the calling user equipment, determining a type of the received message, and transmitting the received message to the application server when the type of the received message is one of a call connection request message and a call connection response message transmitted from a calling party of the call connection request message.

The receiving may include extracting information on identification of the called user equipment and a calling party codec list of the calling user equipment from the received call connection request message.

The determining may include comparing a calling party codec list of the calling user equipment and a called party codec list of the called user equipment, determining that the transcoding is required when a common codec is not included in the calling party codec list and the called party codec list, otherwise, determining that the transcoding is not required.

The determining may include requesting information on the called user equipment to a database server and receiving a called party codec list, session information protocol (SIP) information, session description protocol (SDP) information, and a routing path, as the requested information on the called user equipment.

The determining may include determining that the transcoding is required when a calling party codec list of the calling user equipment includes no codec required by a communication network associated with the called user equipment.

The determining may include determining that the transcoding is required when the calling user equipment does not support a session description protocol (SDP) type of a communication network associated with the called user equipment.

The initiating may include selecting one of codecs, as a first codec, from a called party codec list of the called user equipment; requesting a transcoding server to provide information on the first codec; and generating a transcoding call connection request message by modifying the call connection request message received from the calling party softswitch.

The initiating may include selecting one of codecs, as a first codec, from a called party codec list of the called user equipment, modifying the call connection request message by including the selected first codec as being included in a calling party codec list and changing a source address of the calling user equipment to an address of the transcoding server, and transmitting the modified call connection request message to the called user equipment for call connection request and codec negotiation.

The method may further include receiving a call connection response message from the called user equipment, completing codec negotiation between the calling user equipment and the called user equipment by transmitting the receiving call connection response message to a transcoding server, receiving an encoded call connection response message from the transcoding server, and transmitting the encoded call connection response message to the calling user equipment.

For the receiving a call connection response message, a calling party softswitch associated with the calling user equipment may perform: receiving a message from the called user equipment, determining whether the received call connection response message is transmitted in response to a transcoding call connection request message previously generated by the application server for initiating the transcoding, and transmitting the received call connection response message to the application server when the received call connection response message is associated with the transcoding call connection request message. Otherwise, the calling party softswitch may perform transmitting the received call connection response message to the calling user equipment.

The completing may include selecting one of codecs, as a second codec, included in a calling party codec list of the calling user equipment, transmitting the received call connection response message and information on the selected second codec to the transcoding server, and establishing a first path between the transcoding server and the called user equipment.

The competing may further include receiving an encoded call connection response message from the transcoding server, wherein the encoded call connection response message is encoded using the second codec, modifying the encoded call connection response message to include the second codec as being included in the called codec list of the called user equipment and an address of the transcoding server as a source address of the called user equipment, transmitting the modified call connection response message to the calling user equipment through the calling party softswitch, and establishing a second path between the calling user equipment and the transcoding server.

In accordance with another embodiment, a method may be provided for selectively initiating, by an application server, transcoding between a calling party and a called party. The method may include determining whether transcoding is required for communication between a calling user equipment and a called user equipment based on a call connection request message transmitted from the calling user equipment to the called user equipment, establishing a first communication path between the calling user equipment and a transcoding server and a second communication path between the transcoding server and the called user equipment when the transcoding is determined as required, and enabling the calling user equipment to communicate with the called user equipment through the transcoding server using the first communication path and the second communication path.

The determining may include determining that transcoding is required between the calling user equipment and the called user equipment in at least one condition of: i) when a common codec is not included in codec lists of the calling user equipment and the called user equipment; ii) when an essential codec of a communication network associated with the called user equipment is not included in the calling party codec list; and iii) when a session description protocol (SDP) format type of the communication network associated with the called user equipment is not supported by the calling user equipment.

The establishing a first communication path between the calling user equipment and the transcoding server may include: receiving a call connection response message from the called user equipment in response to the call connection response message; selecting one of codecs, as a second codec, from the calling party codec list; transmitting the received call connection response message to the transcoding server with information on the selected second code; receiving an encoded call connection response message from the transcoding server, wherein the encoded call connection response message is encoded using the second code; modifying the encoded call connection response message to include the second code as being included in the called party codec list and an address of the transcoding server as a source address of the called user equipment; and transmitting the modified call connection response message to the calling user equipment.

The establishing a second communication path between the transcoding server and the called user equipment may include selecting one of codecs, as a first codec, from the called party codec list; modifying the call connection request message to include the first code as being included in the calling party codec list and an address of the transcoding server as a source address of the calling user equipment; and transmitting the modified call connection request message to the called user equipment.

In accordance with at least one embodiment, an application server may be provided for providing an Internet Protocol (IP) communication service to user equipment coupled to a heterogeneous communication network environment including a transcoding server, a database server, a calling party softswitch, and a called party softswitch. The application server may be configured to: determine whether transcoding is required for communication between a calling user equipment and a called user equipment based on a call connection request message transmitted from the calling user equipment to the called user equipment; establish a first communication path between the calling user equipment and the transcoding server and a second communication path between the transcoding server and the called user equipment when the transcoding is determined as required; and enable the calling user equipment to communicate with the called user equipment through the transcoding server using the first communication path and the second communication path.

BRIEF DESCRIPTION OF THE DRAWINGS

The above and/or other aspects of some embodiments of the present invention will become apparent and more readily appreciated from the following description of embodiments, taken in conjunction with the accompanying drawings, of which.

DETAILED DESCRIPTION OF EMBODIMENTS

Figure 1:
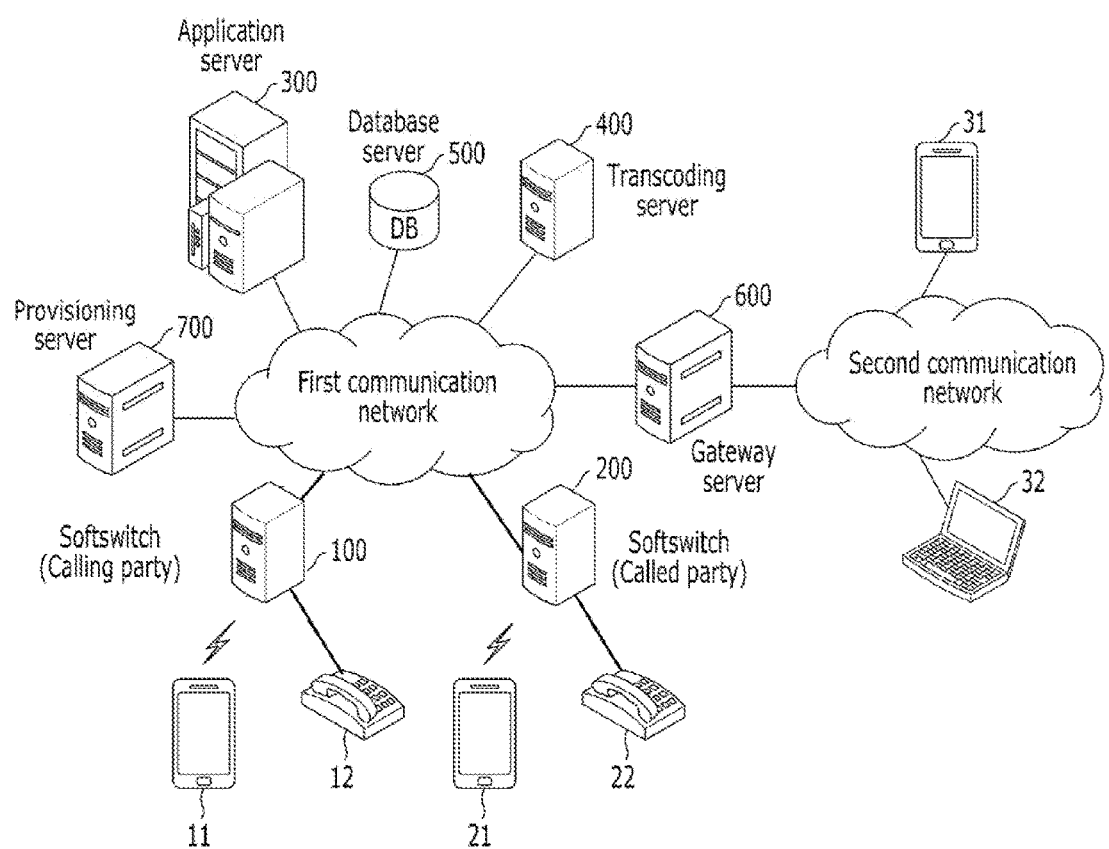
FIG. 1 illustrates communication environment for selective transcoding in accordance with at least one embodiment.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

In accordance with at least one embodiment, transcoding may be selectively performed between a calling party and a called party only when two parties do not have a common codec. In particular, an application server may determine whether transcoding is required between a calling party and a called party before a call connection request message is transmitted to the called party in accordance with at least one embodiment. When the transcoding is required, the application server may establish one channel between a calling party and a transcoding server and the other channel between a called party and the transcoding server and enable the calling party and the called party to communicate to each other through the transcoding server. Hereinafter, such an operation of selective transcoding will be described with reference to FIG. 1.

FIG. 1 illustrates communication environment for selective transcoding in accordance with at least one embodiment.

Referring to FIG. 1, various types of IP communication services may be provided through diverse entities connected through heterogeneous communication network environment. Such heterogeneous communication network may include a packet switched network, a circuit switched network, a core network, an access network, an data network, an IP network, a global system for mobile communications (GSM) network, a universal mobile telecommunications system (UMTS) network, a LTE network, and so forth. The IP communication services may include a voice over IP (VoIP) service and a Voice over Long Term Evolution (VoLTE) service. The VoIP is a group of technologies for delivering voice communications and multimedia sessions over Internet Protocol (IP) networks, such as the Internet. Such a VoIP may be referred to as IP telephony, Internet telephony, broadband telephony, and broadband phone service. The VoLTE is based on the IP multimedia subsystem (IMS) network. The VoLTE delivers a voice service as data flows within the LTE data bearer. Such a VoIP service or a VoLTE service is provided through such a first communication network and a second communication network shown in FIG. 1.

Referring to FIG. 1, a communication network for providing selective transcoding may include a plurality of softswitches (e.g., first softswitch 100 and second softswitch 200), application server 300, transcoding server 400, database (DB) server 500, gateway server 600, provisioning server 700, and a plurality of user equipment 10, 20, and 30. The first communication network may be referred to as a packet switched network or an IP network, which include the IP multimedia subsystem. The second communication network may be a communication network employing technologies or protocols different from that of the first communication network. For example, at least one of user equipment 11, 12, 21, 22, 31, and 32 may communicate with another through the IP multimedia subsystem included in the first communication network 700 using the IP communication service, but the present embodiment is not limited thereto.

User equipment 11, 12, 21, 22, 31, and 32 may be a device capable of communicating with another through a predetermined communication network. For example, user equipment 11, 12, 21, 22, 31, and 32 may support features of an IP phone, such as VoIP and VoLTE. In particular, user equipment 11, 12, 21, 22, 31, and 32 may include a smart phone (e.g., 11, 21, 31), a table personal computer (PC), a laptop computer (e.g., 32), a desktop computer, a personal digital assistance (PDA), a wired/wireless Internet telephone (e.g., 12, 22). That is, user equipment 11, 12, 21, 22, 31, and 32 may denote any device including a memory, a processor, and a communication circuit, which is capable of communicating with another not only through a packet switched network but also through a circuit switched network.

In order to request call connection to a callee, user equipment 11, 12, 21, 22, 31, and 32 may generate and transmit a call connection request message to one of first and second softswitches 100 and 200. For example, when a user of first user equipment 11 initiates an IP call in order to communicate with a user of second user equipment 21, first user equipment 11 may generate a call connection request message and transmit the generated call connection request message to first softswitch 100 in accordance with at least one embodiment.

Such a call connection request message may include information on i) identification of called user equipment (e.g., second user equipment 21), ii) a calling party codec list of a calling user equipment (e.g., first user equipment 11), and iii) a calling party IP address (e.g., a source address). In addition, the call connection request message may further include information on a serving network of the calling user equipment, subscription information associated with the calling user equipment, and service registration information associated with the calling user equipment. The subscription information may be information registered for and required for subscribing a related service through the serving network. The registration information may be information on an associated user and the calling user equipment for registering for the related service. The called user equipment may be also referred to as a called party, a callee party, a callee, a call-receiving party, and a call-receiving user equipment. The calling user equipment may be also referred to as a calling party, a caller party, a calling end, a caller, a call-originating party, and call-originating user equipment. The identification information may be information for identifying the called user equipment. That is, the identification information may be any information that can be used for identifying user equipment or a user thereof. For example, the identification information a telephone number of the called user equipment. The calling party codec list is information on a list of codecs supported by the calling user equipment (e.g., call-originating user equipment). A called party codec list may be information on a list of codecs supported by a called user equipment (e.g., call-receiving user equipment).

Typically, call connection may be established as follows. Calling user equipment 11 may request call-connection to user equipment 21 (e.g., called user equipment) by providing the codec list of calling user equipment 11 to user equipment 21. In order to request call-connection, calling user equipment 11 may generate a call connection request message and transmit the generated call connection request message to called user equipment 21. Called user equipment 21 may select one of codecs in the calling party codec list received from calling user equipment 11 and perform codec negotiation with the calling user equipment based on the selected codec. After completion of the codec negotiation, the call connection may be established between the calling user equipment 11 and user equipment 21 based on the selected codec. However, when the calling party codec list does not include a codec supportable by called user equipment 21, a transcoding process may be performed in accordance with at least one embodiment.

First and second softswitches 100 and 200 may be a central device connecting calls from one phone line to another, across a telecommunication network or the public internet, entirely by means of software running on a general-purpose computer system. First and second softswitches 100 and 200 may perform operation as call session control function (CSCF) in the IP multimedia subsystem. In accordance with at least one embodiment, softswitches 100 and 200 may receive a call connection request message from one of user equipment 10 and 20 and transmit the received call connection request message to application server 300 in order to determine whether a transcoding process is necessary to perform. That is, first and second softswitches 100 and 200 may be set to deliver a call connection request message or a call connection response message from user equipment to application server 300 in accordance with at least one embodiment.

For example, when calling user equipment and called user equipment have no common codec, call-connection between the calling user equipment and the called user equipment becomes failed. In this case, a transcoding process may be necessary to successfully establish the call connection between two parties. Accordingly, softswitches 100 and 200 may transmit the call connection request message from one of user equipment 10 and 20 to application server 300 to determine whether a transcoding process is necessary to perform between the user equipment.

Application server 300 may receive the call connection request message from user equipment and determine whether a transcoding process is necessary to perform in accordance with at least one embodiment. When the transcoding process is determined as not necessary, first softswitch 100 associated with calling user equipment 11 may receive an original call connection request message, which was received from the calling user equipment and delivered to application server 300, from application server 300 and transmit the original call connection request message to second softswitch 20 associated with called user equipment 21 and requests call-connection to called user equipment 21 through the original call connection request message in accordance with at least one embodiment.

When the transcoding process is determined as necessary, first softswitch 100 may receive a transcoding call connection request message generated by and transmitted from application server 300 and transmits the transcoding call connection request message another softswitch (e.g., second softswitch 20) to request call connection in accordance with at least one embodiment. The transcoding call connection request message may include a codec supportable by the called user equipment (e.g., user equipment 21) in order to successfully perform the call negotiation process between user equipment 11 (e.g., calling party) and user equipment 21 (e.g., called party).

Application server 300 may determine that transcoding is required between a calling user equipment and a called user equipment i) when a common codec is not included in codec lists of the calling user equipment and the called user equipment, ii) when an essential codec of a communication network associated with the called user equipment is not included in the calling party codec list, and/or iii) when a session description protocol (SDP) format type of the communication network associated with the called user equipment is not supported by the calling user equipment. Application server 300 may obtain such information from database server 500 or provisioning server 700 through a communication network upon generation of a predetermined event.

Furthermore, first and second softswitches 100 and 200 may receive a call connection response message from another softswitch in response to at least one of the original call connection request message and the transcoding call connection request message. In this case, first and second softswitches 100 and 200 may transmit the received call connection response message to application server 300 in accordance with at least one embodiment. That is, first and second softswitches 100 and 200 may be configured to transmit a call connection response message to application server 300 when first and second softswitches 100 and 200 receive a call connection response message.

Softswitches 100 and 200 may perform a codec negotiation process based on a predetermined procedure. Called user equipment may select a supportable codec from a calling party codec list included in a call connection request message, generate a call connection response message with the selected codec, and transmit the generated response message to a source softswitch.

Application server 300 may be a computing system connected to an associated communication network and perform operations to provide associated services. Application server 300 may be operated and owned by a service provider, but the present invention is not limited thereto. Application server 300 may be an application server defined in the IP multimedia subsystem.

In particular, application server 300 may receive the call connection request message from calling user equipment (e.g., user equipment 11), extract identification information of called user equipment (e.g., user equipment 21) from the call connection request message, and obtain information on a codec list of the called user equipment based on the extracted identification information. The codec list of the called user equipment may be referred to as a called party codec list. Such called party codec list may be stored in application server 300 or database (DB) server 500 in connection with each user equipment. Application server 300 may store information on a codec list of each user equipment when each user equipment is registered for a service associated with application server 300. Or, when user equipment is registered at a communication network, the user equipment may provide information on a codec list and identification to database server 400. Furthermore, application server 400 may obtain such information from provisioning server 700. However, the present embodiment is not limited thereto.

For obtaining the codec list, application server 300 may search codec lists based on the identification information included in the call connection request message from first softswitch 100 through own memory or database server 400. For determining whether a transcoding process is necessary, application server 300 may obtain the calling party codec list and the called party codec list, compare the obtained codec lists, and determine whether a common codec is included in both of the obtained codec lists. In addition, application server 300 may obtain information on session initiation protocol (SIP) information, session description protocol (SDP) information, identification information (e.g., telephone number), a codec list, subscriber information, registration information, and so forth of respective user equipment from database server 400.

When there is a common codec in both of the calling party codec list and the called party codec list, application server 300 may determine that a transcoding process is not necessary. In this case, application server 300 transmits the original call connection request message back to first softswitch 100 and controls first softswitch 100 to transmit the original call connection request message to second softswitch 200 and to request establishing call connection with called user equipment 21.

When there is not a common codec in both of the calling party codec list and the called party codec list, application server 300 determines that a transcoding process is necessary. In this case, application server 300 may request transcoding server 400 (e.g., media server) to provide at least one of codecs included in the called party code list in accordance with at least one embodiment. Upon the receipt of the requested codec, application server 300 may generate the transcoding call connection request message by including the received codec in the original call connection request message. That is, it is necessary to perform the transcoding process when the calling party codec list does not include codecs that the called user equipment can support. Accordingly, application server 300 may request transcoding server 400 to provide a codec that the called user equipment can support.

In addition to include information on the codec obtained from transcoding server 400, application server 300 may change a calling party address in the transcoding call connection request message to an address of transcoding server 400. The calling party address may be an IP address of calling user equipment (e.g., caller) and may be referred to as a source address. Accordingly, by changing the source address of the call connection request message to an address of transcoding server 400, codec negotiation may be successfully performed between transcoding server 400 and called user equipment 21 and a real-time transport protocol (RTP) path between transcoding server 400 and called user equipment 21 may be established as a second RTP path in accordance with at least one embodiment.

Furthermore, application server 300 may receive a call connection response message from softswitches 100 and 200 (e.g., softswitch associated with calling user equipment) in response to one of the original call connection request message and the transcoding call connection request message. Application server 300 may determine whether the call connection response message is corresponding to the original call connection request message or the transcoding call connection request message based on information included in the call connection response message. The call connection response message may include information on a calling party address of a corresponding request message, a called party address, a codec list, and so forth. For example, when the call connection response message may include the calling party address of a corresponding call connection request message as an address of transcoding server 400, application server 300 may determine that the received call connection response message is corresponding to the transcoding call connection request message. Otherwise, application server 300 may determine that the received call connection response message is corresponding to the original call connection request message. However, the present embodiment is not limited thereto.

Upon the receipt of the call connection response message corresponding to the transcoding call connection request message, application server 300 may transmit the received call connection response message to transcoding server 400. By transmitting the received call connection response message to transcoding server 400, code negotiation between called user equipment 21 and transcoding server 400 may be completed in accordance with at least one embodiment. In addition, a real-time transport protocol (RTP) path may be established between transcoding server 400 and called user equipment 21 in accordance with at least one embodiment.

In particular, application server 300 may generate the transcoding call connection request message to include a calling party address as the address of transcoding server 400 and a calling party codec list having a first codec, provided from transcoding server 400 and supportable by called user equipment 21, when application server 300 determines that the transcoding process is necessary between calling user equipment 11 and called user equipment 21. Such a transcoding call connection request message is transmitted to called user equipment 21. Called user equipment 21 selects the first codec from the calling party codec list in the transcoding call connection request message, generates the call connection response message, and transmits the generated call connection response message. Since called user equipment 21 can find a supportable codec from the calling party codec list, codec negotiation between called user equipment 21 and a calling party can be performed successfully although the calling party is changed from calling user equipment 11 to transcoding server 400 in accordance with at least one embodiment.

As a result of successful codec negotiation, a first RTP path between transcoding server 400 (e.g., calling party) and called user equipment 21 may be established. Through such a second RTP path, called user equipment 21 encodes voice data or/and video data with the first codec and transmit the encoded voice/video data to transcoding server 400 through the second RTP.

In addition, application server 300 may modify the received call connection response message and transmit the modified call connection response message to calling user equipment 11 through softswitch 100 in accordance with at least one embodiment. In particular, application server 300 may change a source address of the received call connection response message to an address of transcoding server 400 in accordance with at least one embodiment. Furthermore, application server 300 may select one codec from the calling party code list and include the selected codec (e.g., second codec) as a negotiated codec. By transmitting the modified call connection response message to calling user equipment 11, codec negotiation may be successfully performed between transcoding server 400 and calling user equipment 11 and a real-time transport protocol (RTP) path between transcoding server 400 and calling user equipment 11 may be established as a first RTP path in accordance with at least one embodiment. As a result of successful codec negotiation, a first RTP path between transcoding server 400 (e.g., called party) and calling user equipment 11 may be established. Through such a first RTP path, calling user equipment 11 encodes voice data or/and video data with the second codec and transmit the encoded voice/video data to transcoding server 400 through the first RTP.

After modification, application server 300 may transmit the modified message to transcoding server 400 and request transcoding server 400 to convert the call response message using the second codec included in the calling party codec list. Application server 300 may receive the converted response message from transcoding server 400 and transmit the converted response message to calling user equipment 11 through softswitch 100. In this case, application server 300 may complete a codec negotiation process between the transcoding server 400 and calling user equipment 11. That is, a codec between calling user equipment 11 and transcoding server 400 may be set to use the second codec.

After the completion of the codec negotiation process between calling user equipment 11 and called user equipment 21, two paths (e.g., channels) may be established between calling user equipment 11 and called user equipment 21 through transcoding server 400. For example, the second path may be established between calling user equipment 11 and transcoding server 400 and the first path may be established between transcoding server 400 and called user equipment 21. Transcoding server 400 may perform a transcoding process for matching codecs between calling user equipment 11 and called user equipment 21 and support transmission and reception of the voice and video data therebetween.

For example, transcoding server 400 receives voice/video data encoded in the second codec and transmitted from calling user equipment 11 through the second path, decodes the received voice/video data into original voice/video data, encodes the original voice/video data using the first codec, and transmits the encoded voice/video data to called user equipment 21 through the first path. For another example, transcoding server 400 receives voice/video data encoded in the first codec and transmitted from called user equipment 21 through the first path, decodes the received voice/video data into original voice/video data, encodes the original voice/video data using the second codec, and transmits the encoded voice/video data to calling user equipment 11 through the second path.

Such transcoding server 400 may be referred to as a media server in the IP multimedia subsystem. Transcoding server 400 may provide a typical IP communication service, such as a conference call service or announcement. For example, transcoding server 400 (e.g., media server) may directly connect user equipment (e.g., calling user equipment 11 and called user equipment 21) through a real time protocol (RTP). Furthermore, transcoding server 400 (e.g., media server) may perform in response to control of application server 300, play back a video media, a recording voice, synthesizing, and transcoding processes.

Database (DB) server 500 may store information on user equipment, which is associated to provide an IP communication service. For example, database server 500 may store information on a codec list, a supportable protocol list and a routing path of respective user equipment. SIP and SDP may be an IP communication protocol for codec negotiation. The supportable protocol list may include session initial protocol (SIP) for call generation, call modification, call termination and session description protocol (SDP) for expressing codec information supported by corresponding user equipment or servers for codec negotiation. In addition, database server 500 may include information on an essential codec of each communication network, information for modifying a SDP format.

Database server 500 may be provided with such information when user equipment is registered for an IP communication service at application server 300 and/or when user equipment is registered at a corresponding communication network. Such information may be modified and updated upon generation of a predetermined event.

Database server 500 may also store session initiation protocol (SIP) information, session description protocol (SDP) information, identification information (e.g., telephone number), a codec list, subscriber information, registration information, and so forth. Such information may be obtained from provisioning server 700. Provisioning server 700 may be a server associated with a service provider. When a user registers at an associated server for a desired service (e.g., IP communication service) provided by the service provider, or when associated user equipment registers at a predetermined network, provisioning server 700 may collect various types of information on the user, user equipment associated with the user, and network properties for utilizing the desired service and provide the collected information to database server 500.

Such a selective transcoding service may be provided to user equipment connected to a communication network employing different technologies or protocols as compared to a communication network coupled to the other party (e.g., called or calling user equipment). Gateway server 600 may provide such connectivity between heterogeneous communication networks (e.g., the first communication network and the second communication network). Gateway server 600 may be referred to as breakout gateway (e.g., breakout gateway control function (BGCF) or public switched telephone number (PSTN) gateway (PSTN/CS gateway control function (PGCF) in the IP multimedia subsystem.

As described, application server 300 may determine whether transcoding is required between a calling party and a called party before a call connection request message is transmitted to the called party in accordance with at least one embodiment. When the transcoding is required, application server 300 may establish one channel between a calling party and transcoding server 400 and the other channel between a called party and transcoding server 400 and enable the calling party and the called party to communicate to each other through transcoding server 400 in accordance with at least one embodiment. Hereinafter, such operation of application server 300 will be described in detail with reference to FIG. 2 and FIG. 3.

Figure 2:
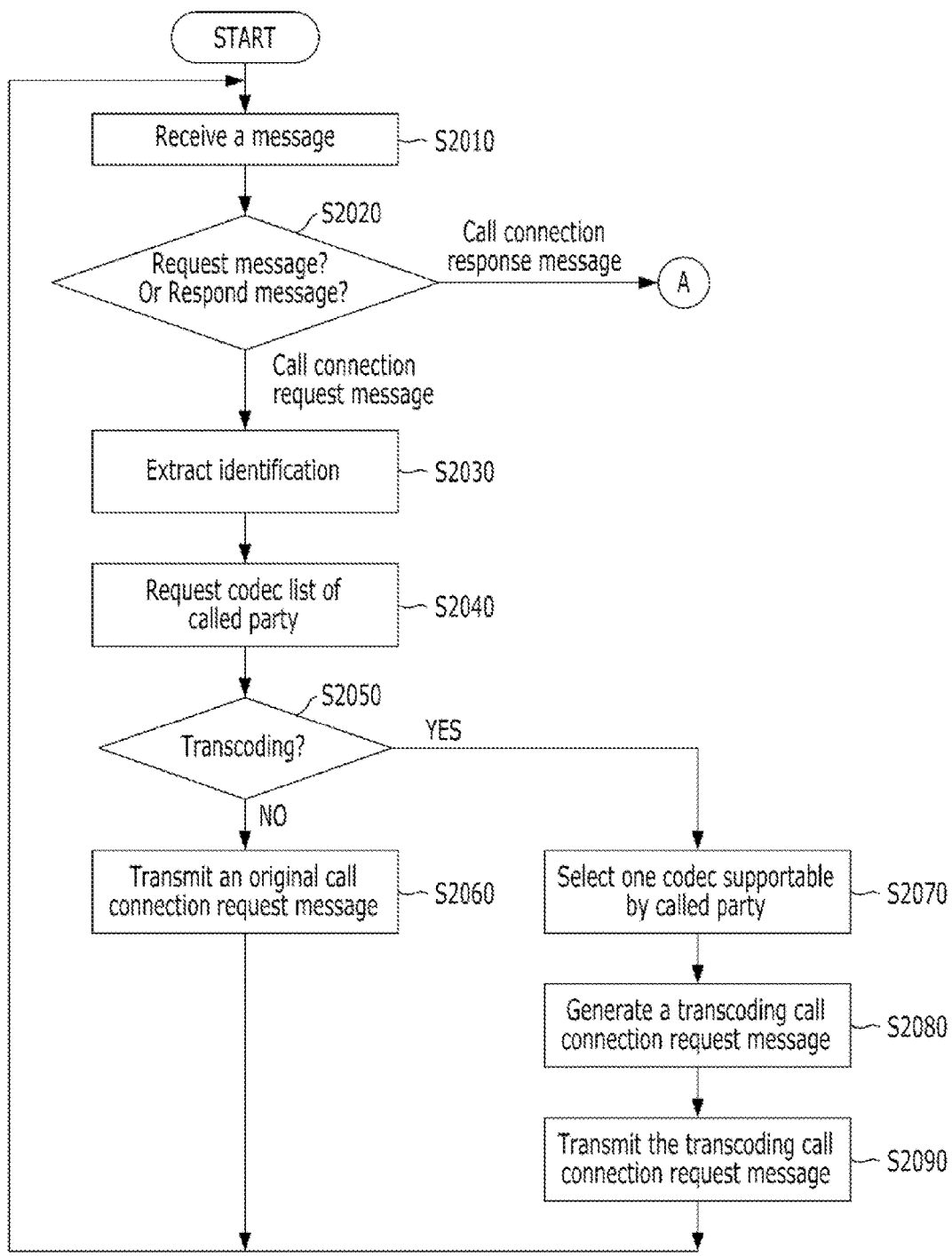
FIG. 2 and FIG. 3 illustrate a selective transcoding operation of an application server in accordance with at least one embodiment.
Figure 3:
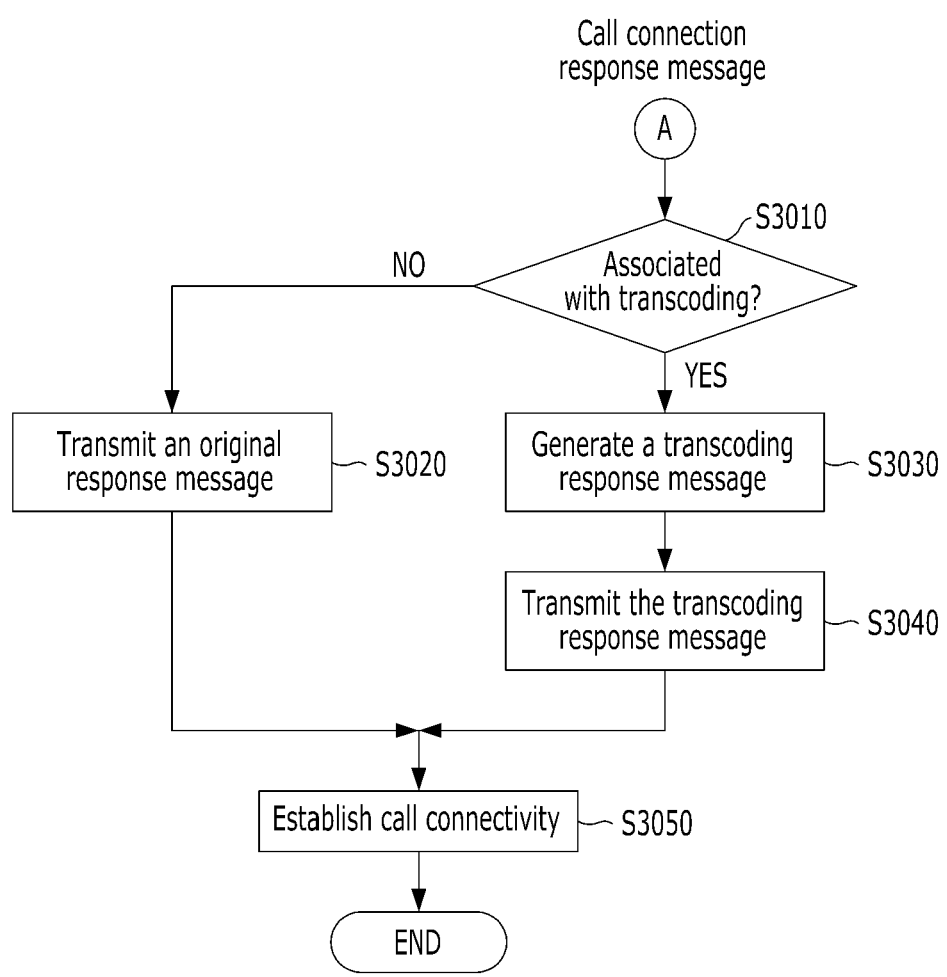

FIG. 2 and FIG. 3 illustrate a selective transcoding operation of an application server in accordance with at least one embodiment.

Referring to FIG. 2, when a message is received at step S2010, determination may be made so as whether the received message is a call connection request message or a call connection response message at step S2020. For example, when application server 300 receives a message transmitted from softswitches 100 and 200, application server 300 determines whether the received message is a call connection request message from a calling party (e.g., user equipment 11) or a call connection response message from a called party (e.g., user equipment 21) in response to a previous call connection request message. Such determination may be performed based on information included in the message.

When the received message is the call connection request message (Call connection request message—S2020), identification information may be extracted from the call connection request message at step S2030. The identification information may be a telephone number of a called party (e.g., called user equipment 21). For example, application server 300 extracts information on identification of called user equipment from the received call connection request message. In addition, the call connection request message may include information on a calling party codec list, a calling party address, a called party address, and so forth.

At step S2040, information on a called party code list may be obtained. For example, application server 300 may search for the called party codec list based on the extracted identification information. That is, application server 300 searches through own memory or requests database server 500 or provisioning server 700 to provide the called party code list by sending the information on the extracted identification information to database server 500. In addition, application server 300 may obtain SIP information, SDP information, network information, subscription information and registration information of the called party from at least of database server 500 and provisioning server 700 through exchanging a request message and a response message therebetween.

At step S2050, determination may be made so as whether transcoding is required between the calling party and the called party. For example, application server 300 may compare a calling party codec list of calling user equipment 11 and the called party code list of called user equipment 21. Alternatively, application server 300 may determine whether the calling party code list of calling user equipment 11 has a codec essentially required in a serving communication network of called user equipment 21, or may determine whether calling user equipment 11 supports a SDP format type of a serving communication network of called user equipment 21.

When transcoding is determined as not required (No-S2050), an original call connection request message may be transmitted to a softswitch associated with the calling party in order to transmit the original call connection request message to the called party at step S2060. For example, when there is a common codec between the calling party codec list and the called party codec list, application server 300 determines that transcoding is not required. In this case, application server 300 transmits the original call connection request message, which is received from the calling party, to softswitch 100 associated with the calling party. Then, softswitch 100 may transmit the original call connection request message to softswitch 200 associated with the called party according to a predetermined protocol. In addition, when the calling party code list of calling user equipment 11 has a codec essentially required in a serving communication network of called user equipment 21, or when calling user equipment 11 supports a SDP format type of a serving communication network of called user equipment 21, application server 300 may determine that the transcoding is not required between calling user equipment 11 and called user equipment 21.

When transcoding is determined as required (Yes-S2050), one may be selected from the called party codec list at step S2070. For example, when a common codec is not included in the calling party codec list and the called party codec list, application server 300 determines that transcoding is required between the calling party and the called party. In addition, when the calling party code list of calling user equipment 11 does not have a codec essentially required in a serving communication network of called user equipment 21, or when calling user equipment 11 does not support a SDP format type of a serving communication network of called user equipment 21, application server 300 may determine that the transcoding is not required between calling user equipment 11 and called user equipment 21.

In this case, application server 300 may select one codec from the called party codec list based on a predetermined policy and determine a SDP type of the called party, which may be stored in database server 500. Then, application server 300 transmits information on the selected codec and the determined SDP type of the called party to transcoding server 400. Application server 300 may also request transcoding server 400 to support the selected codec (e.g., first codec), which is included in the called party codec list, for codec negotiation and transcoding. In response to the request and information, transcoding server 400 may prepare resources (e.g., channel) for transcoding between the called party and the calling party and provide information on the first codec, required for codec negotiation with the called party, to application server 300.

At step S2080, a transcoding call connection request message may be generated. For example, application server 300 may receive the information on the first codec from transcoding server 400 and generate the transcoding call connection request message by modifying the original call connection request message. In detail, application server 300 may generate the transcoding call connection request message to include the provided information on the selected codec (e.g., first codec) as one of the calling party codec list and an IP address of transcoding server 400 as a source address of the calling party, but the present embodiment is not limited thereto.

At step S2090, the transcoding call connection request message may be transmitted. For example, application server 300 transmits the transcoding call connection request message to softswitch 100 associated with calling user equipment 11 in order to request call connection to called user equipment 21. In this case, softswitch 100 transmits the transcoding call connection request message to softswitch 200 associated with softswitch 200 in order to request call connection to called user equipment 21. In this case, the transcoding call connection request message includes information on the first codec supportable by called user equipment 21. Accordingly, codec negotiation will be performed successfully. Furthermore, since the transcoding call connection request message includes the IP address of transcoding server 400 as a source address of a calling party, a communication path between transcoding server 400 and called user equipment 21 may be established after the codec negotiation in accordance with at least one embodiment.

After transmitting one of the original call connection request message and the transcoding call connection request message, application server 300 may wait for another message from softswitches 100 and 200.

Referring to FIG. 3, when a received message is a call connection response message (Response message—S2020), determination may be made so as whether the received response message is in response to the original call connection request message or the transcoding call connection request message at step S3010. For example, when application server 300 receives the call connection response message at step S2020, application server 300 determines whether the received response message is associated with transcoding call connection request message or not at step S3010.

Such determination may be made by detecting the source address of the calling party. When the source address of the calling party is an IP address of transcoding server 400, application server 300 may determine that the received response message is associated with the transcoding call connection request message in accordance with at least one embodiment.

When the received response message is associated with the original call connection request message (No—S3010), the original call connection response message may be transmitted at step S3020. For example, application server 300 transmits the received response message to softswitch 100 without modification when the call connection response message is determined as associated with the original call connection request message.

When the received response message is associated with the transcoding call connection request message (Yes—S3020), the received response message may be transmitted to transcoding server 400 for completing codec negotiation at step S3030. For example, application server 300 transmits the received call connection response message to transcoding server 400. This response message may be encoded based on the first codec, to transcoding server 400, but the present embodiment is not limited thereto.

By transmitting the received call connection response message to transcoding server 400, transcoding server 400 can complete codec negotiation with called user equipment 21. Furthermore, transcoding server 400 may store information on calling user equipment 11 and called user equipment 21 for performing transcoding when calling user equipment 11 and called user equipment 21 communicate through transcoding server 400. Transcoding server 400 may set up the first codec as a transcoding codec between transcoding server 400 and called user equipment 21. If the response message is encoded using the first codec, transcoding server 400 may convert the received response message using a second codec which is one of the calling party codec list, but the present embodiment is not limited thereto. The second codec may be selected by application server 300 based on a predetermined policy and provided to transcoding server 400 when application server 300 requests transcoding server 400 to support transcoding between calling user equipment 11 and called user equipment 21.

At step 3040, the response message may be received. For example, application server 300 receives the response message from transcoding server 400. Upon receipt of the response message, application server 300 may modify the response message to include the second codec as being included in the called party codec list and an address of transcoding server 400 as a source address of the called party. That is, application server 300 generates a transcoding response message to include information on the second codec and the address of transcoding server 400.

At step S3050, the transcoding response message may be transmitted. For example, application server 300 transmit the transcoding response message to softswitch 100 associated with called user equipment 11. By transmitting the transcoding response message to called user equipment 11 through softswitch 100, codec negotiation between the calling user equipment 11 and called user equipment 21 may be completed. As a result, a communication path may be established between calling user equipment 11 and transcoding server 400 in accordance with at least one embodiment.

As described, two communication paths may be established between calling user equipment 11 and called user equipment 21 for performing transcoding in accordance with at least one embodiment. Through such communication paths, two parties (e.g., calling user equipment 11 and called user equipment 21) may be communicated using an IP communication service at step S3060.

Figure 4:
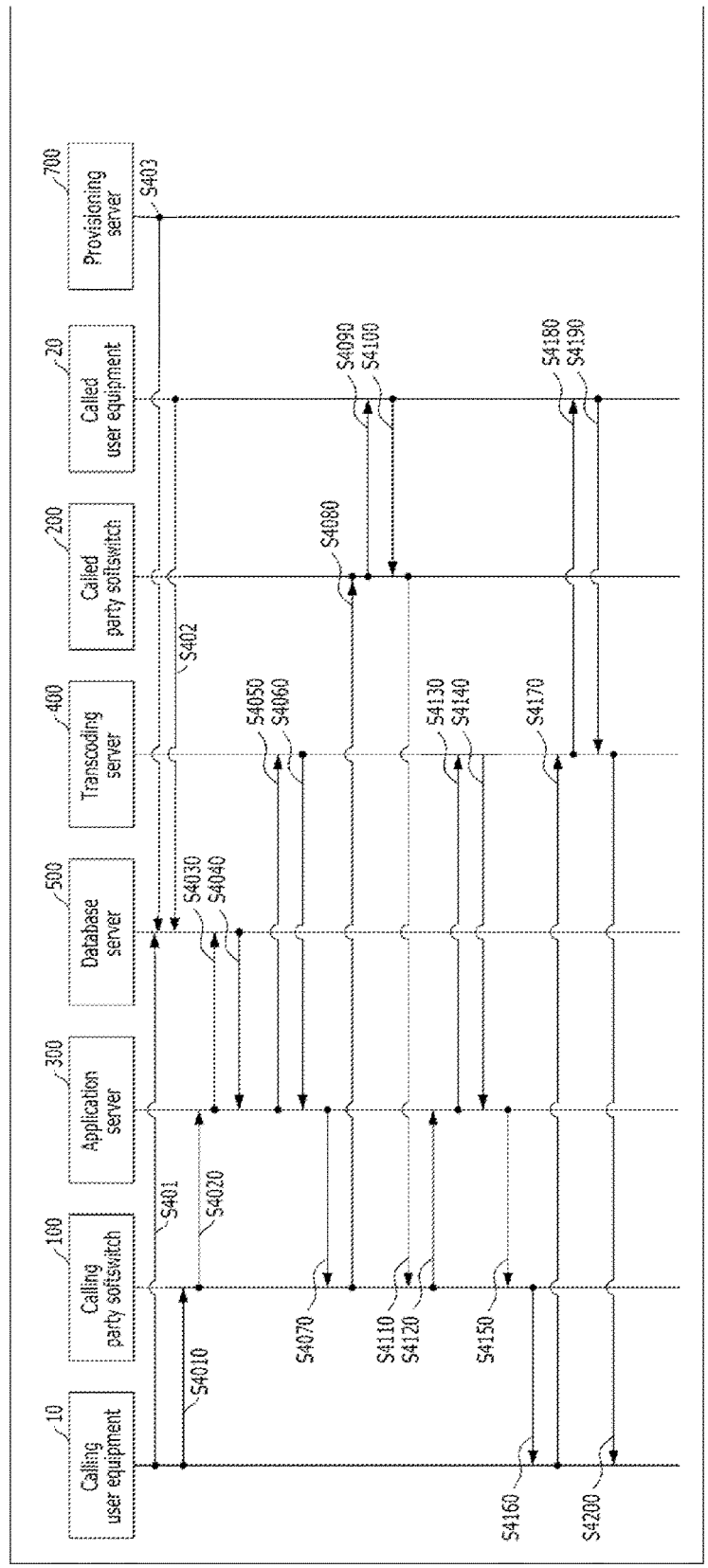
FIG. 4 illustrates a timing diagram for describing overall operation for selective transcoding in accordance with at least one embodiment.

FIG. 4 illustrates a timing diagram for describing overall operation for selective transcoding in accordance with at least one embodiment.

Referring to FIG. 4, calling user equipment 10 and called user equipment 20 may provide information related to an IP communication service to database server 500 when calling user equipment 10 and called user equipment 20 register at an associated network at steps S401 and S402. Such information may include session initiation protocol (SIP) information, session description protocol (SDP) information, identification information (e.g., telephone number), a codec list, subscriber information, and registration information, of calling user equipment 10 and called user equipment 20. In addition, such information may be obtained from provisioning server 700 to database server 400 at step S403. Provisioning server 700 may collect various types of information on a user, user equipment associated with the user, and network properties for utilizing the desired service when the user registers at an associated server for a desired service (e.g., IP communication service) or when associated user equipment registers at a predetermined network. Upon generation of a predetermined event, provisioning server 700 may provide the collected information to database server 500. Such information stored in database server 500 may be provided to application server 300 for determining whether transcoding is required to perform in accordance with at least one embodiment.

Calling user equipment 10 transmits a call connection request message to calling party softswitch 100 in order to communicate with called user equipment 20 using an IP communication service at step S4010. Calling party softswitch 100 may be set to transmit predetermined messages associated with an IP communication service to application server 300. Accordingly, calling party softswitch 100 transmits the received call connection request message to application server 300 at step S4020.

At step S4030, application server 300 extracts identification information on a called party (e.g., called user equipment 20) from the received call connection request message and request database server 500 to provide information on the called party. Such information may be provided by provisioning server 700 directly to application server 300. Or, provisioning server 700 may provide and regularly update the information to database server 500, but the present embodiment is not limited thereto.

At step S4040, database server 400 fetches information on the called party based on the identification information on the called party from application server 300 and provides the fetched information to application server 300. The fetched information on the called party may include a called party codec list, a SDP format type, and a communication path.

At step S4050, application server 300 selects one of codecs from the called party codec list, provides the selected codec (e.g., first codec) and the SDP format type to transcoding server 400, and request transcoding server 400 to provide information on the selected codec (e.g., first codec) and to support transcoding and codec negotiation to called user equipment 20.

At step S4060, transcoding server 400 provides the requested information on the first codec to application server 300 and prepares resources for transcoding and codec negotiation to called user equipment 20. At step S4070, application server 300 receive the request information on the first codec from transcoding server 400, generates a transcoding call connection request message by modifying the original call connection request message, and transmits the generated transcoding call connection request message to calling party softswitch 100. That is, application server 300 includes the first codec in the calling party codec list and changes a source address of the calling party to an IP address of transcoding server 400 to generate the transcoding call connection request message.

At step S4080, calling party softswitch 100 receives the transcoding call connection request message and transmits the transcoding call connection request message to called party softswitch 200 for request call connection according to a predetermined protocol.

At step S4090, called party softswitch 200 receives the transcoding call connection request message and transmits the received transcoding call connection request message to called user equipment 21. In this case, called party softswitch 200 may determine whether the received message includes the address of transcoding server 400 as a source address of a calling party. If the address of transcoding server 400 is the source address of the calling party, called party softswitch 200 may transmit the received message to a called party designated in the received message. Otherwise, called party softswitch 200 may transmit the received message to application server 300.

At step S4100, called user equipment 21 generates a call connection response message in response to the received transcoding call connection request message. Since the transcoding call connection request message includes the first codec supportable by called user equipment 21 and the IP address of transcoding server 400 as the source address of the calling party, called user equipment 21 may generate a normal call connection response message for codec negotiation. Called user equipment 21 transmits the generated call connection response message to called party softswitch 200.

At step S4110, called party softswitch 200 transmits the call connection response message to calling party softswitch 100. At step S4120, calling party softswitch 100 receives the call connection response message, determines that the received message is corresponding to the transcoding call connection request message, and transmits the received response message to application server 300.

At step S4130, application server 300 selects one of codecs from the calling party codec list and transmits the received call connection response message to transcoding server 400 with information on the selected codec. At step S4140, transcoding server 400 sets up transcoding resources and complete codec negotiation based on the call connection response message using the second codec and transmit information on the second codec and the completed codec negotiation to application server 300.

At step S4150, application server 300 may modify the response message to include the second codec as being included in the called party codec list and the address of transcoding server 400 as a source address of the called user equipment 21 and transmit the modified message to calling party softswitch 100.

At step S4160, calling party softswitch 100 transmits the modified message to calling user equipment 10 and calling user equipment 10 completes codec negotiation based on the information included in the modified message. That is, codec negotiation is successfully performed and a communication path between calling user equipment 10 and transcoding server 400 is established.

At step S4170, calling user equipment 10 transmits voice and video data encoded using the second codec to transcoding server 400. At step S4180, transcoding server 400 converts the encoded voice and video data to original voice and video data, encodes the original voice and video data using the first codec, and transmits the encoded voice and video data to called user equipment 20.

At step S4190, called user equipment 20 transmits voice and video data encoded using the first codec to transcoding server 400. At step S4200, transcoding server 400 converts the encoded voice and video data to original voice and video data, encodes the original voice and video data using the second codec, and transmits the encoded voice and video data to calling user equipment 10.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of selectively performing, by an application server, transcoding between a calling party and a called party, the method comprising:
   receiving a call connection request message from a calling user equipment;
   determining whether transcoding is required for communication between the calling user equipment and a called user equipment based on information included in the received call connection request message;
   initiating the transcoding when the transcoding is determined as required;
   receiving a call connection response message from the called user equipment; and
   completing codec negotiation between the calling user equipment and the called user equipment by transmitting the receiving call connection response message to a transcoding server, receiving an encoded call connection response message from the transcoding server, and transmitting the encoded call connection response message to the calling user equipment
   wherein the completing comprises:
      selecting one of codecs, as a first codec, included in a calling party codec list of the calling user equipment;
      transmitting the received call connection response message and information on the selected first codec to the transcoding server; and
      establishing a first path between the transcoding server and the called user equipment.

2. The method of claim 1, wherein the receiving a call connection request message comprises:
   by a calling party softswitch associated with the calling user equipment, receiving a message from the calling user equipment;
   by the calling party softswitch, determining a type of the received message; and
   by the calling party softswitch, transmitting the received message to the application server when the type of the received message is one of the call connection request message and a call connection response message transmitted from a calling party of the call connection request message.

3. The method of claim 1, wherein the receiving a call connection request message comprises:
   extracting information on identification of the called user equipment and the calling party codec list of the calling user equipment from the received call connection request message.

4. The method of claim 1, wherein the determining comprises:
   comparing the calling party codec list of the calling user equipment and a called party codec list of the called user equipment;
   determining that the transcoding is required when a common codec is not included in the calling party codec list and the called party codec list;
   otherwise, determining that the transcoding is not required.

5. The method of claim 1, wherein the determining comprises:
   requesting information on the called user equipment to a database server; and
   receiving a called party codec list, session information protocol (SIP) information, session description protocol (SDP) information, and a routing path, as the requested information on the called user equipment.

6. The method of claim 1, wherein the determining comprises:
   determining that the transcoding is required when the calling party codec list of the calling user equipment includes no codec required by a communication network associated with the called user equipment.

7. The method of claim 1, wherein the determining comprises:
   determining that the transcoding is required when the calling user equipment does not support a session description protocol (SDP) type of a communication network associated with the called user equipment.

8. The method of claim 1, wherein the initiating comprises:
   selecting one of codecs, as a second codec, from a called party codec list of the called user equipment;
   requesting the transcoding server to provide information on the first codec second codec; and
   generating a transcoding call connection request message by modifying the call connection request message received from the calling party softswitch.

9. The method of claim 1, wherein the initiating comprises:
   selecting one of codecs, as a second codec, from a called party codec list of the called user equipment;
   modifying the call connection request message by including the selected second codec as being included in the calling party codec list and changing a source address of the calling user equipment to an address of the transcoding server; and
   transmitting the modified call connection request message to the called user equipment for call connection request and codec negotiation.

10. The method of claim 1, wherein the receiving a call connection response message comprises:

by a calling party softswitch associated with the calling user equipment, receiving a message from the called user equipment;

by the calling party softswitch, determining whether the received call connection response message is transmitted in response to a transcoding call connection request message previously generated by the application server for initiating the transcoding; and by the calling party softswitch, transmitting the received call connection response message to the application server when the received call connection response message is associated with the transcoding call connection request message;

otherwise, transmitting the received call connection response message to the calling user equipment.

11. The method of claim 1, wherein the competing further comprises:

receiving an encoded call connection response message from the transcoding server, wherein the encoded call connection response message is encoded using the first codec;

modifying the encoded call connection response message to include the first codec as being included in the called codec list of the called user equipment and an address of the transcoding server as a source address of the called user equipment;

transmitting the modified call connection response message to the calling user equipment through the calling party softswitch; and establishing a second path between the calling user equipment and the transcoding server.

12. A method of selectively initiating, by an application server, transcoding between a calling party and a called party, the method comprising:

determining whether transcoding is required for communication between a calling user equipment and a called user equipment based on a call connection request message transmitted from the calling user equipment to the called user equipment;

establishing a first communication path between the calling user equipment and a transcoding server and a second communication path between the transcoding server and the called user equipment when the transcoding is determined as required; and enabling the calling user equipment to communicate with the called user equipment through the transcoding server using the first communication path and the second communication path, wherein the establishing a first communication path between the calling user equipment and the transcoding server comprises:

receiving a call connection response message from the called user equipment in response to the call connection response message;

selecting one of codecs, as a first codec, from the calling party codec list;

transmitting the received call connection response message to the transcoding server with information on the selected first codec;

receiving an encoded call connection response message from the transcoding server, wherein the encoded call connection response message is encoded using the first codec;

modifying the encoded call connection response message to include the first codec as being included in the called party codec list and an address of the transcoding server as a source address of the called user equipment; and transmitting the modified call connection response message to the calling user equipment.

13. The method of claim 12, wherein the determining comprises:

determining that transcoding is required between the calling user equipment and the called user equipment in at least one condition of: i) when a common codec is not included in the codec lists of the calling user equipment and the called user equipment; ii) when an essential codec of a communication network associated with the called user equipment is not included in the calling party codec list; and iii) when a session description protocol (SDP) format type of the communication network associated with the called user equipment is not supported by the calling user equipment.

14. The method of claim 12, wherein the establishing a second communication path between the transcoding server and the called user equipment comprises;

selecting one of codecs, as a second codec, from the called party codec list;

modifying the call connection request message to include the second codec as being included in the calling party codec list and an address of the transcoding server as a source address of the calling user equipment; and transmitting the modified call connection request message to the called user equipment.

15. An application server of providing an Internet Protocol (IP) communication service to user equipment coupled to a heterogeneous communication network environment including a transcoding server, a database server, a calling party softswitch, and a called party softswitch, the application server comprising at least one memory configured to store information and data, at least one of communication circuits configured to communicate with the user equipment, the transcoding server, the database service, the calling party softswitch, and the called party softswitch, and at least one processors configured to perform operations based on the information and data stored in the at least one memory or exchanged through the at least one communication circuits, wherein the processor is configured to:

determine whether transcoding is required for communication between a calling user equipment and a called user equipment based on a call connection request message transmitted from the calling user equipment to the called user equipment;

establish a first communication path between the calling user equipment and the transcoding server and a second communication path between the transcoding server and the called user equipment when the transcoding is determined as required;

enable the calling user equipment to communicate with the called user equipment through the transcoding server using the first communication path and the second communication path;

establish the first communication path by receive a call connection response message from the called user equipment in response to the call connection response message, selecting one of codecs, as a first codec, from the calling party codec list, transmitting the received call connection response message to the transcoding server with information on the selected first codec, receiving an encoded call connection response message from the transcoding server, wherein the encoded call connection response message is encoded using the first codec, modifying the encoded call connection response message to include the first codec as being included in the called party codec list and an address of the transcoding server as a source address of the called user equipment, and transmitting the modified call connection response message to the calling user equipment; and establish the second communication path by selecting one of codecs, as a second codec, from the called party codec list, modifying the call connection request message to include the second codec as being included in the calling party codec list and an address of the transcoding server as a source address of the calling user equipment, and transmitting the modified call connection request message to the called user equipment.

16. The application server of claim 15, wherein the application server is configured to:

determine that transcoding is required between the calling user equipment and the called user equipment in at least one condition of: i) when a common codec is not included in the codec lists of the calling user equipment and the called user equipment; ii) when an essential codec of a communication network associated with the called user equipment is not included in the calling party codec list; and iii) when a session description protocol (SDP) format type of the communication network associated with the called user equipment is not supported by the calling user equipment.

* * * * *

UNITED STATES PATENT AND TRADEMARK OFFICE
CERTIFICATE OF CORRECTION

PATENT NO. : 9,894,128 B2  
APPLICATION NO. : 14/802983  
DATED : February 13, 2018  
INVENTOR(S) : Jin-Geun Lee et al.

Page 1 of 1

It is certified that error appears in the above-identified patent and that said Letters Patent is hereby corrected as shown below:

In the Claims

In Claim 8, Column 20, Line 50, "on the first codec second codec;" should be amended to --on the second codec;--.

Signed and Sealed this  
Thirty-first Day of July, 2018

Andrei Iancu  
*Director of the United States Patent and Trademark Office*